United States Patent [19]

Sucharczuk

[11] Patent Number: 6,018,525
[45] Date of Patent: *Jan. 25, 2000

[54] ATM TRANSPORT OF VOICE BAND SIGNALS WITH CHANNEL ASSOCIATED SIGNALING

[75] Inventor: Mark Sucharczuk, Mountain View, Calif.

[73] Assignee: Sprint Communications Company, L.P., Kansas City, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/613,953

[22] Filed: Mar. 11, 1996

[51] Int. Cl.[7] ................. H04J 3/24; H04J 3/12; H04L 12/56

[52] U.S. Cl. .......... 370/394; 370/467; 370/474; 370/523

[58] Field of Search ................ 370/394, 474, 370/905, 523, 467, 395–399, 522, 527, 466, 476, 465

[56] References Cited

U.S. PATENT DOCUMENTS

| | | |
|---|---|---|
| 4,730,312 | 3/1988 | Johnson . |
| 5,115,431 | 5/1992 | Williams ............... 370/94.1 |
| 5,327,433 | 7/1994 | Hall . |
| 5,392,402 | 2/1995 | Robrock . |
| 5,394,398 | 2/1995 | Rau ............... 370/60.1 |
| 5,548,580 | 8/1996 | Buckland ............... 370/17 |
| 5,550,819 | 8/1996 | Duault ............... 370/60.1 |
| 5,577,039 | 11/1996 | Won ............... 370/474 |
| 5,661,725 | 8/1997 | Buck . |
| 5,666,349 | 9/1997 | Petri . |
| 5,673,262 | 9/1997 | Shimizu . |
| 5,719,863 | 2/1998 | Hummel . |
| 5,751,706 | 5/1998 | Land . |

OTHER PUBLICATIONS

ITU Draft Recommendation I.363.1, B–ISDN ATM Adaptation Layer (AAL) Specification, Types & 2, Jul. 21, 1995.
The ATM Forum Technical Committee, Circuit Emulation Service Interoperability Specification Version 2.0 (Baseline Draft), 95–1504, Dec. 1995.

Primary Examiner—William Luther
Attorney, Agent, or Firm—Harley R. Ball

[57] ABSTRACT

The invention is a method for transporting a voice band signal with channel-associated signaling over an ATM system. The method comprises converting the signal into ATM cells so that the sequence numbers in the cells correspond to the location of the signaling in the cells. After transmission over the ATM system, the ATM cells are converted back into the signal using the sequence numbers in the cells to locate the signaling in the cells. The convergence sublayer indication bit of a segmentation and reassembly protocol data unit header of an ATM adaption layer 1 ATM cell can be used as a portion of the sequence numbers so that the sequence numbers can use a repeating 12-count sequence.

15 Claims, 5 Drawing Sheets

| CELL SEQUENCE NUMBER | OCTETS OF A BITS | OCTETS OF B BITS |
|---|---|---|
| 1 | 6, 18, 30, 42 | 12, 24, 36 |
| 2 | 7, 19, 31, 43 | 1, 13, 25, 37 |
| 3 | 8, 20, 32, 44 | 2, 14, 26, 38 |
| 4 | 9, 21, 33, 45 | 3, 15, 27, 39 |
| 5 | 10, 22, 34, 46 | 4, 16, 28, 40 |
| 6 | 11, 23, 35, 47 | 5, 17, 29, 41 |
| 7 | 12, 24, 36 | 6, 18, 30, 42 |
| 8 | 1, 13, 25, 37 | 7, 19, 31, 43 |
| 9 | 2, 14, 26, 38 | 8, 20, 32, 44 |
| 10 | 3, 15, 27, 39 | 9, 21, 33, 45 |
| 11 | 4, 16, 28, 40 | 10, 22, 34, 46 |
| 12 | 5, 17, 29, 41 | 11, 23, 35, 47 |
| 1 | 6, 18, 30, 42 | 12, 24, 36 |
| 2 | 7, 19, 31, 43 | 1, 13, 25, 37 |

| CELL SEQUENCE NUMBER | OCTETS OF A BITS | OCTETS OF B BITS |
|---|---|---|
| 1 | 6, 18, 30, 42 | 12, 24, 36 |
| 2 | 7, 19, 31, 43 | 1, 13, 25, 37 |
| 3 | 8, 20, 32, 44 | 2, 14, 26, 38 |
| 4 | 9, 21, 33, 45 | 3, 15, 27, 39 |
| 5 | 10, 22, 34, 46 | 4, 16, 28, 40 |
| 6 | 11, 23, 35, 47 | 5, 17, 29, 41 |
| 7 | 12, 24, 36 | 6, 18, 30, 42 |
| 8 | 1, 13, 25, 37 | 7, 19, 31, 43 |
| 9 | 2, 14, 26, 38 | 8, 20, 32, 44 |
| 10 | 3, 15, 27, 39 | 9, 21, 33, 45 |
| 11 | 4, 16, 28, 40 | 10, 22, 34, 46 |
| 12 | 5, 17, 29, 41 | 11, 23, 35, 47 |
| 1 | 6, 18, 30, 42 | 12, 24, 36 |
| 2 | 7, 19, 31, 43 | 1, 13, 25, 37 |

FIG. 5

ATM TRANSPORT OF VOICE BAND SIGNALS WITH CHANNEL ASSOCIATED SIGNALING

BACKGROUND

The invention relates to telecommunications, and in particular, the invention relates to the transport of voice band signals with channel-associated signaling (CAS) through an Asynchronous Transfer Mode (ATM) system.

The well known DS-1 signal is a Time Division Multiplex (TDM) signal. The TDM signal can be structured into a 12 frame Superframe (SF) structure or a 24 frame Extended Superframe (ESF) structure. Both SF and ESF are well known in the art. FIG. 1 shows the composition of an ESF formatted TDM signal. The frame is comprised of 24 bytes from 24 separate voice channels and one overhead bit (not shown) for a total of 193 bits. The channels are byte-interleaved, meaning that a byte from channel one is followed by a byte from channel two, then a byte from channel three, and so on through channel 24. An ESF formatted TDM signal is comprised of 24 consecutive frames.

Channel-associated signaling is well known in the art. It is also known as robbed bit signaling. This is because the least significant bits of each channel in a given frame are "robbed" from the user and are used to carry signaling information. In an SF formatted TDM signal, bits are robbed in from each channel in frames 6 and 12. In an ESF formatted TDM signal, bits are robbed in frames 6, 12, 18, and 24. The signaling bits from the 6th frame are known as A bits and the signaling bits from the 12th frame are known as B bits. The signaling bits in the 18th and 24th frames may be called C and D bits, but they are typically a repetition of the A and B bits.

Asynchronous Transfer Mode (ATM) systems are also well known. ATM is a packet based system that uses fixed-length 53 byte (octet) cells. Each cell has a 5 octet header and a 48 octet payload. The functionality that converts signals to and from the ATM format is known as an ATM Adaption Layer (AAL). Standard AALs have been developed. The AAL used to transfer constant bit rates, such as uncompressed voice, is known as AAL 1. FIG. 2 depicts a cell created by AAL 1. The cell has a 5 octet ATM header and a one octet Segmentation and Reassembly Protocol Data Unit (SAR PDU) header in the first octet of the cell payload. This means that the cell now contains a five octet header, a one octet SAR PDU header, and 47 octets of SAR PDU payload. The SAR PDU header consists of a Convergence Sublayer Indication (CSI) bit, a Sequence Count Field (SCF) of 3 bits, a Cyclic Redundancy Check (CRC) field of 3 bits, and an Even Parity bit.

As depicted on FIG. 2, the prior art uses three bits for a sequence number. Three bits allow for an eight count (0–7). The CSI bit is sometimes used to hold clock synchronization information, but it may go unused. The remaining four bits in the SAR PDU header are used as an error check on the sequence number. Typically, the sequence number is used to detect lost or misplaced cells at the receiving end of the system At present, a technique has been proposed to transport voice band channel-associated signaling through an ATM system. This proposed solution separates the A and B bits from the rest of the user information and transports these signaling bits in a special signaling octet. The signaling octet is placed after the 24 octets and comprises a 25th octet in the ATM payload.

This solution is lacking. Three disadvantages are:
1. Increased bandwidth requirement.
A 25th octet is added to carry the signaling information for every 24 octets of data. This means an additional 4% of bandwidth is required.
2. Performance degradation
Signaling bits are separated from the payload for transmission and are reinserted at the receiver. The reinsertion point is often in a different frame than the original frame the bits were taken from. This means that valid bits are replaced with the reinserted signaling bits. In effect, two bits have now been "robbed" to carry one signaling bit. This degrades performance.
3. Equipment complexity.
In general, the same equipment will have to handle both clear 64 kbit/s channels without signaling and voice band channels with signaling. If only signaling bits are to be removed from the signals, the clear 64 kbit/s channels without signaling will have to be processed differently than the 64 kbit/s voice channels with signaling. This increases the complexity of the equipment.

SUMMARY

The invention is a method for transporting a voice band signal with channel-associated signaling over an ATM system. The method comprises converting the signal into ATM cells so that the sequence numbers in the cells correspond to the location of the signaling in the cells. After transmission over the ATM system, the ATM cells are converted back into the signal using the sequence numbers in the cells to locate the signaling in the cells. The convergence sublayer indication bit of a segmentation and reassembly protocol data unit header of an ATM adaption layer 1 ATM cell can be used as a portion of the sequence numbers so that the sequence numbers can use a repeating 12-count sequence.

DESCRIPTION OF THE DRAWINGS

FIG. 5 depicts a table for a version of the invention.

DETAILED DESCRIPTION

Figure 1:
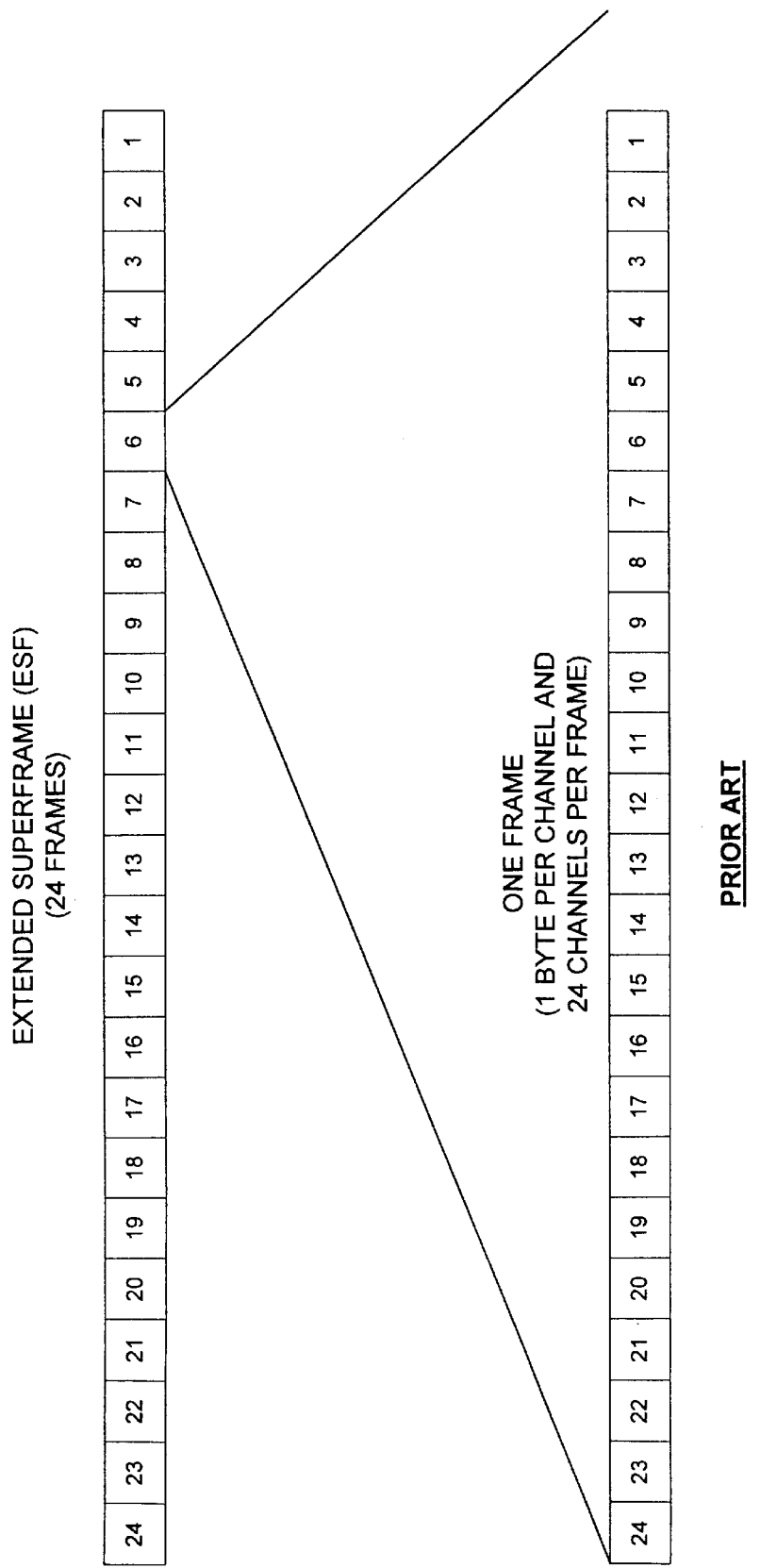
FIG. 1 depicts an ESF formatted TDM signal.
Figure 2:
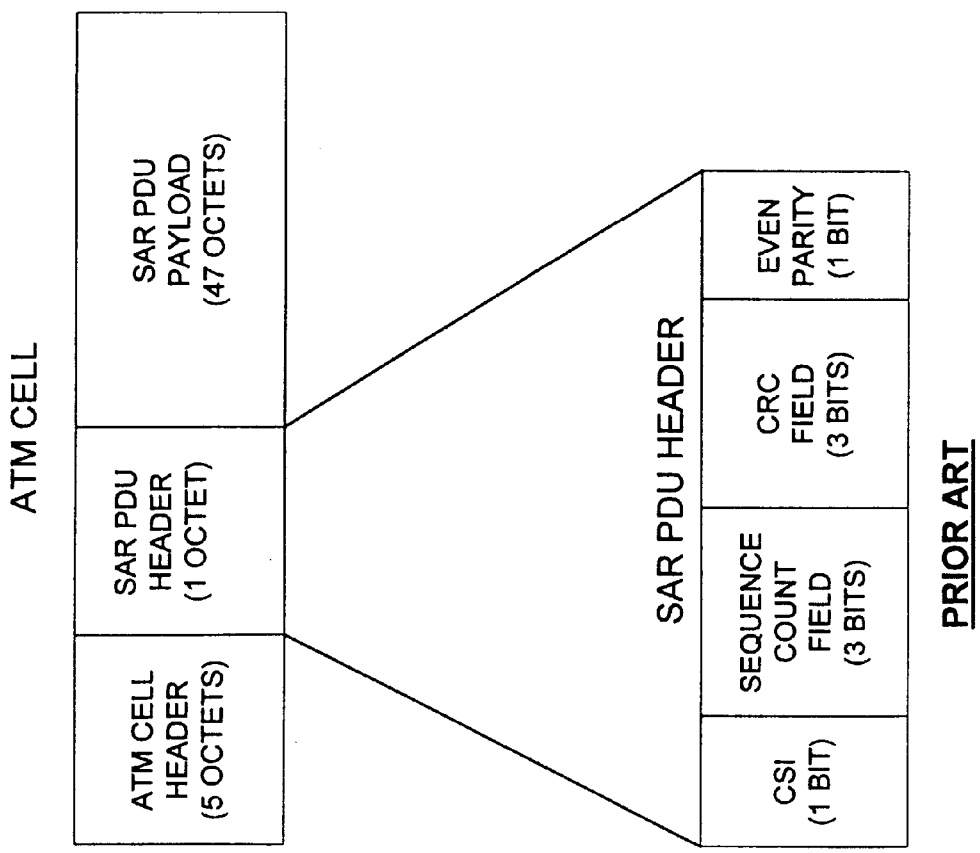
FIG. 2 depicts an ATM cell from AAL 1.
Figure 3:
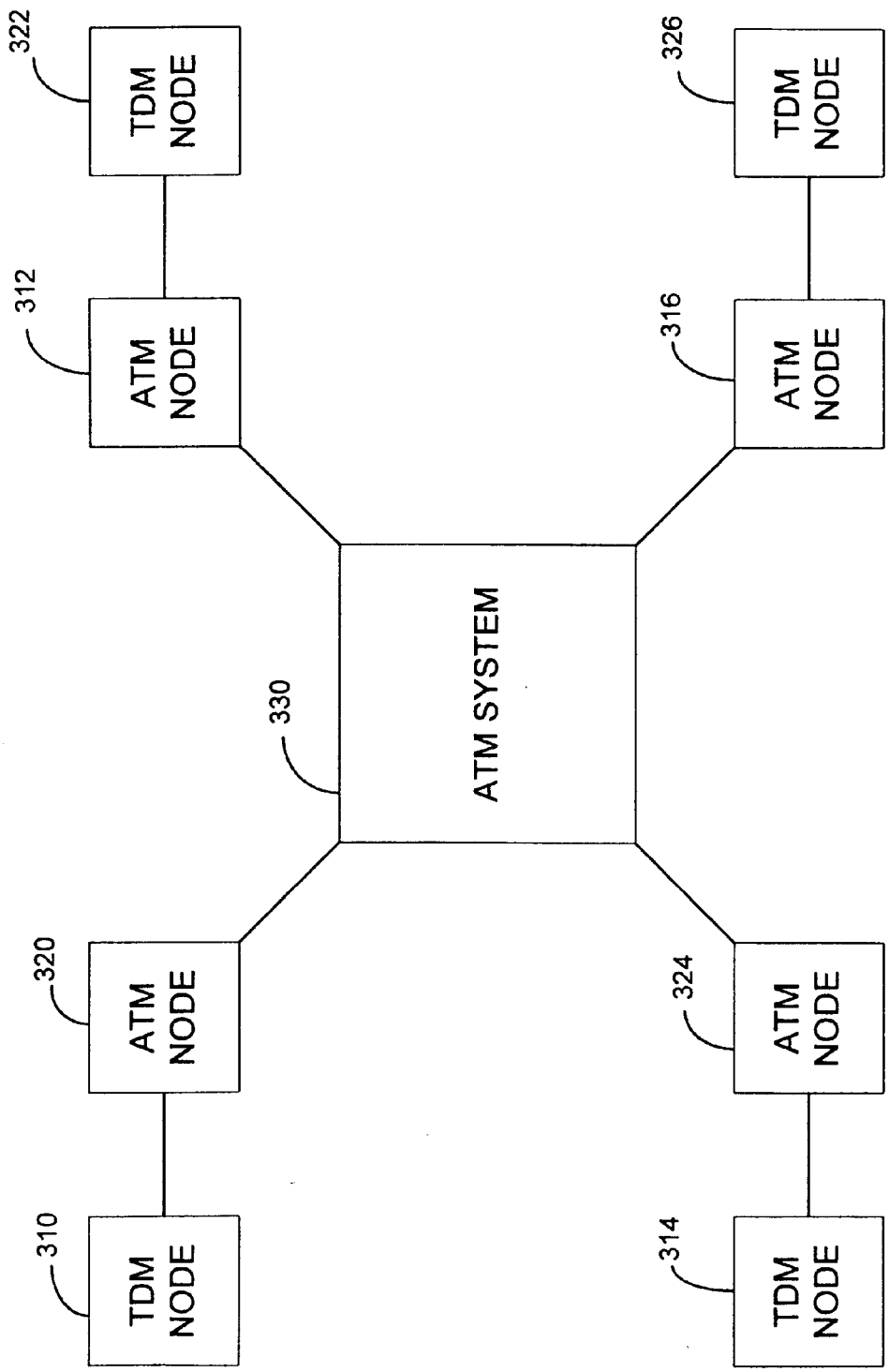
FIG. 3 depicts a block diagram of a system for use with a version of the invention.

The present invention provides a solution to the prior art problems encountered when transporting voice channels with channel associated signaling (CAS) through an ATM system. As discussed in the Background section above, FIG. 1 depicts a TDM signal in ESF format and FIG. 2 depicts an ATM cell with an AAL 1 SAR PDU. FIG. 3 depicts a system in which the present invention could be employed. Shown are TDM nodes 310, 314, 322, and 326. These nodes represent any source of TDM signals that use CAS. Such nodes are well known in the art. TDM nodes 310, 314, 322, and 326 are connected to ATM nodes 312, 316, 320, and 324 respectively. These connections could be conventional T1 ESF or SF connections.

ATM nodes are any node that can convert between TDM signals and ATM cells. Except as modified in accord with the invention, such devices are known in the art. These devices would contain an AAL 1 function to convert the TDM signal into ATM cells. ATM nodes 312, 316, 320, and 324 are connected to ATM system 330. ATM system 330 routes ATM cells. Such systems are known in the art.

Typically, TDM signals from the TDM nodes are converted to ATM cells at the ATM nodes. The ATM cells are transported by ATM system 330 from one ATM node to another. The ATM nodes re-convert the ATM cells back into TDM signals and transfer the TDM signals to the TDM nodes for subsequent transport. For example, channel 2 of a particular TDM signal may be transmitted through ATM system 330 from TDM node 310 to TDM node 314.

Figure 4:
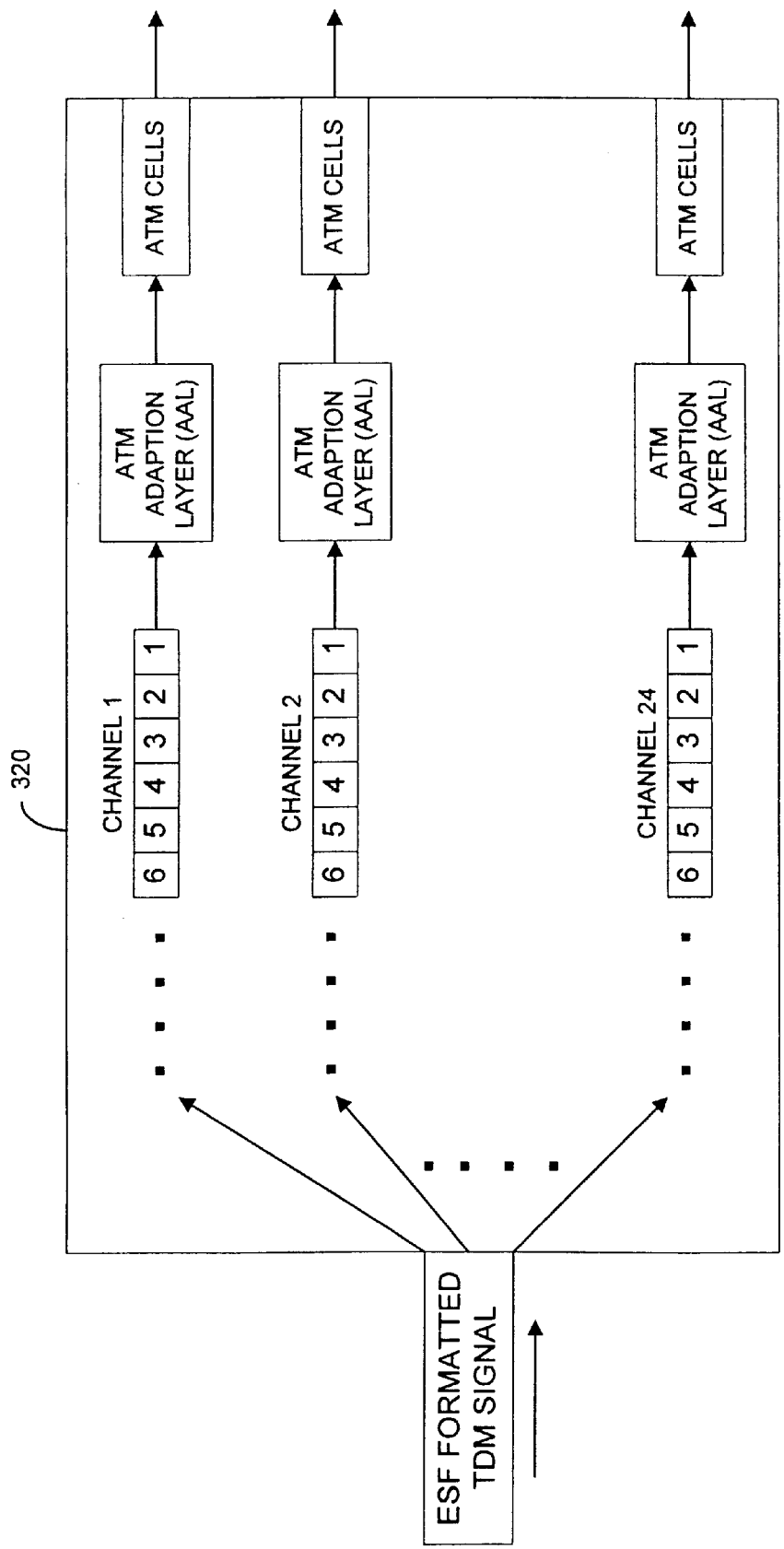
FIG. 4 depicts a logic diagram for a version of the invention.

Referring to FIG. 4, Channel 2 will arrive at ATM node 320 in an ESF formatted TDM signal. ATM node 310 will separate the bytes of the TDM signal into 24 individual voice channels. Like the other channels, channel 2 will have A and B signaling bits. Since the 6th, 12th, 18th, and 24th frames have the signaling bits, Channel 2 will have A bits in the 6th and 18th bytes and B bits in the 12th and 24th bytes. ATM node 320 will convert channel 2 into ATM cells using an AAL function.

Referring again to FIG. 3, ATM node 320 will transport the ATM cells containing channel 2 to ATM system 330 for transmission to ATM node 324. If desired, the other channels in the TDM signal may be transmitted elsewhere. This means that ATM node 324 may re-combine channel 2 with channels from other TDM signals to form a new TDM signal. At ATM node 324, the ATM cells for channel 2 are re-converted back into an TDM signal, and the TDM signal is transmitted to TDM node 314.

In accord with the present invention, the AAL functionality in the ATM nodes is altered to allow for the efficient and reliable transport of the TDM signaling bits in their original locations. As mentioned in the Background section above, prior systems remove the A and B bits and place them into different octets from the user information. This means that the A and B bits have to be re-combined with the TDM signal by ATM node 324.

The present invention does not separate the A and B bits from the user information. This means that the A and B bits remain embedded within the user information transported by the ATM cells. The present invention can do this because it creates a correspondence between the ATM cell sequence number and the octets that contain the A and B bits. The correspondence is created by enhancing the sequence number.

In the present invention, the CSI bit is used as an added bit to the sequence number. As discussed in the Background section above, FIG. 2 depicts the CSI bit and the sequence number bits. If the CSI bit is used as a sequence number bit, this gives the sequence number four bits instead of three. Now the sequence number can count to 16 instead of just 8.

Given the SAR PDU header octet in the payload, 47 octets are available in each cell to carry user information. To convert the voice band channel into an ATM cell, octets from the voice band channel are mapped into the ATM cell octets. After 47 octets have been filled in a cell, a new cell is must be created. Given the ESF structure of A bits every 12 octets, A bits occur in the 6th octet, the 18th octet, the 30th octet, and the 42nd octet in the first cell. The next A bit will occur 12 octets later—in the 7th octet of the next cell payload. This is because after the 42nd octet, the cell has 5 more octets left (43, 44, 45, 46, and 47). The next cell will need 7 octets to get to the 12th octet.

As the cells are created they are given consecutive sequence numbers. The present invention differs from the prior art because a 4-bit modulo 12-count sequence number is used instead of a 3-bit modulo 8-count sequence number. After the 12th cell, the sequence number would repeat itself. FIG. 5 depicts the correspondence between the 12-count sequence number and the location of the A and B bits. Note that the locations of the A and B bits repeat every 12 cells. This is because of the 47 octet payload, the 12 count sequence number, and the 12 octet separation between A bits (or B bits). The correspondence does not occur with an 8-count sequence number.

By corresponding the sequence number to the location of the A and B signaling bits, the AAL at the receiving end is able to locate the A and B bits based on the sequence number of the cell Prior systems do not encode the location of the A and B bits in the sequence number.

The 12 count sequence number allows the A and B bits to remain embedded within the signal. This accounts for lower bandwidth than prior systems because no additional octets are added to carry signaling bits. This accounts for better performance because the A and B bits are not removed and re-combined later at a new location. This accounts for less complexity because clear 64 kbit/s signals can be processed the same as 64 kbit/s signals with signaling. A further advantage is that the 12-count sequence number also allows lost and missequenced cells to be tracked over a string of 11 cells instead of 7. This increases the ability to detect lost or missequenced cells and retain synchronization.

It should also be noted that the clock of a TDM node (and TDM signal) may perform differently than the clock in an ATM node. This will result in the occasional subtraction or addition of complete frames that is known as controlled frame slippage. This causes a disruption of the cell sequence numbers. For proper operation, the transmitting ATM node needs to communicate to the receiving ATM node that the change in the sequence is due to the frame slip. This communication is achieved by sending parity violation bits in the SAR PDU overhead and detecting the violation at the receiving node. The receiving node should be able to recognize the controlled frame slippage condition and react accordingly. Those skilled in the art will appreciate how this could be done.

Those skilled in the art will appreciate variations of the embodiments specifically disclosed above. As a result, the invention should not be restricted to only the embodiments above, but should be measured by the following claims.

I claim:

1. A method for transporting a voice band signal with channel-associated signaling over an ATM system, the method comprising:
    receiving the voice band signal with channel-associated signaling at a first ATM node;
    converting the signal into ATM cells wherein sequence numbers in the ATM cells correspond to locations of the channel-associated signaling in the ATM cells and wherein the sequence numbers use a repeating 12-count sequence;
    transmitting the ATM cells from the first ATM node to a second ATM node;
    receiving the ATM cells at the second ATM node; and
    converting the ATM cells back into the signal using the sequence numbers in the cells to determine the locations of the channel-associated signaling in the cells.

2. The method of claim 1 wherein a convergence sublayer indication bit of a segmentation and reassembly protocol data unit header of an ATM adaption layer 1 ATM cell is used as a portion of the sequence numbers.

3. The method of claim 1 wherein the signal is an extended superframe formatted time division multiplexed signal.

4. The method of claim 1 wherein the signal is transported by a channel of an extended superframe formatted time division multiplexed signal.

5. The method of claim 1 wherein the signal is a superframe formatted time division multiplexed signal.

6. The method of claim 1 wherein the signal is transported by a channel of a superframe formatted time division multiplexed signal.

7. The method of claim 1 wherein frame slippage is handled by sending parity violation bits in the segmentation and reassembly protocol data unit header of an ATM adaption layer 1 ATM cell from the first ATM node and detecting the violation at the second ATM node.

8. A method for transporting a voice signal with channel-associated signaling over an ATM system, the method comprising:

receiving the voice signal with channel-associated signaling at a first ATM node;

converting the signal into an ATM cell and corresponding a sequence number having at least four bits in the ATM cell with a location of the channel-associated signaling within the ATM cell;

transmitting the ATM cell from the first ATM node to a second ATM node;

receiving the ATM cell at the second ATM node; and converting the ATM cell back into the voice signal and using the sequence number in the ATM cell to locate the channel-associated signaling in the ATM cell.

9. The method of claim 8 wherein the sequence number is based on a repeating 12-count sequence.

10. The method of claim 8 wherein a convergence sublayer indication bit of a segmentation and reassembly protocol data unit header of an ATM adaption layer 1 ATM cell is used as a portion of the sequence number.

11. The method of claim 8 wherein the signal is an extended superframe formatted time division multiplexed signal.

12. The method of claim 8 wherein the signal is carried by a channel of an extended superframe formatted time division multiplexed signal.

13. The method of claim 8 wherein the signal is a superframe formatted time division multiplexed signal.

14. The method of claim 8 wherein the signal is carried by a channel of a superframe formatted time division multiplexed signal.

15. The method of claim 8 wherein frame slippage is handled by sending parity violation bits in the segmentation and reassembly protocol data unit header of an ATM adaption layer 1 ATM cell from the first ATM node and detecting the violation at the second ATM node.

* * * * *